United States Patent [19]

Noda et al.

[11] Patent Number: 4,523,281
[45] Date of Patent: Jun. 11, 1985

[54] AUTOMATIC TRANSMISSION CONTROLLER FOR AUTOMOBILES

[75] Inventors: Munetaka Noda, Chiryu; Yukio Tobe, Kariya; Yutaka Taga; Shinya Nakamura, both of Toyota; Kazumasa Nakamura, Okazaki; Takafumi Inagaki; Hiroshi Ito, both of Toyota, all of Japan

[73] Assignees: Nippondenso Co., Ltd., Kariya; Toyota Jidosha Kabushiki Kaisha, Toyota, both of Japan

[21] Appl. No.: 400,402

[22] Filed: Jul. 21, 1982

[30] Foreign Application Priority Data

Jul. 23, 1981 [JP] Japan .............................. 56-115701

[51] Int. Cl.³ .................. F16H 5/66; B60K 41/06; B60K 41/22; G06F 15/20
[52] U.S. Cl. .................................. 364/424.1; 74/866; 192/0.033; 192/3.54
[58] Field of Search .............. 364/424.1; 74/866, 867, 74/868; 192/0.033, 3.54–3.55

[56] References Cited

U.S. PATENT DOCUMENTS

| | | | |
|---|---|---|---|
| 3,448,640 | 6/1969 | Nelson | 74/866 |
| 4,208,925 | 6/1980 | Miller et al. | 74/866 |
| 4,208,929 | 6/1980 | Heino et al. | 74/866 X |
| 4,253,348 | 3/1981 | Will et al. | 74/866 |
| 4,262,335 | 4/1981 | Ahlen et al. | 74/866 X |
| 4,335,428 | 6/1982 | Miki et al. | 364/424.1 |
| 4,373,619 | 2/1983 | Schritt et al. | 74/866 X |
| 4,393,467 | 7/1983 | Miki et al. | 364/424.1 |
| 4,393,732 | 7/1983 | Suzuki et al. | 74/866 |
| 4,414,863 | 11/1983 | Heino | 74/866 |

Primary Examiner—Felix D. Gruber
Attorney, Agent, or Firm—Cushman, Darby & Cushman

[57] ABSTRACT

An electronic automatic transmission control system for an automobile comprises speed sensor means for detecting the speed of the automobile, load sensor means for detecting engine load, solenoids for controlling the automatic transmission including a lock-up clutch of a torque converter and a computer for receiving signals from the sensor means and for controlling the solenoids, the computer having a memory RAM and ROM for storing shift pattern data representing a plurality of lock-up patterns comprising three sorts of modes, i.e., power mode, economy mode and normal mode, in addition to a plurality of shift patterns comprising three sorts of modes, i.e., power mode, economy mode and normal mode. Any shift pattern and lock-up pattern is selected in one of three sorts of modes from a plurality of the shift patterns and lock-up patterns in accordance with correlation of the running speed and the engine load, and a combined pattern of the shift solenoid and the lock-up solenoid is selected according to the selected shift pattern and lock-up pattern, thereby gear shift and lock-up can be controlled. Safety provisions include dual speed sensors (speedometer) and (transmission output shaft) and fault detecting circuitry to maintain safe operation.

5 Claims, 10 Drawing Figures

ID-PATENT-4,523,281

AUTOMATIC TRANSMISSION CONTROLLER FOR AUTOMOBILES

BACKGROUND OF THE INVENTION

1. Field of the Invention

This invention relates to an electronic automatic transmission controller for automobiles and more particularly to such a controller whereby an automatic transmission is controlled by selectively combining the driving pattern of shift solenoids and that of a lockup solenoid which are controllably driven in accordance with shift solenoid pattern data and lockup solenoid pattern data.

2. Description of the Prior Art

It is well known that an automobile having an automatic transmission generally have an electronic controller whereby the position at which a speed is to be changed, i.e., to be shifted-down or shifted-up may be predetermined according to the shift pattern established from the interrelation between their speeds, engine loads and throttle opening percentage, and that further improveed automatic transmissions have a controller that operate a lockup solenoid when overdriving, to couple the engine output from the torque converter to provide the locking up. The lockup solenoid provides a mechanical direct-coupling thereof to the automatic transmission, thereby eliminating the power conveyance loss in the torque converter.

However, locking-up only when overdriving is not necessarily advisable upon consideration of the running characteristics of automatic transmissions. With a foward 4-speed automatic transmission, for example, locking-up in the 2nd- or 3rd- speed range according to the interrelation between their running speeds and throttle opening degree may be more advisable from the standpoint of fuel economy.

SUMMARY OF THE INVENTION

It is an object of this invention to provide economy of fuel by the effective operation of the automatic transmission. This is accomplished by an electronic controller having speed sensors for detecting the speeds of an automobile and an engine load sensor for detecting engine loads thereof and controllably driving the solenoids according to signals from the sensors. The electronic controller includes a memory for storing, in advance, shift pattern data and lockup pattern data, and an operational processor for performing operational processing according to at least the running speed signal, engine load signal, and shift and lockup pattern data read from the memory to put out a shift solenoid drive control signal and lockup solenoid drive control signal in order to control the automatic transmission by the combined pattern between the driving pattern of the shift solenoids and that of the lockup solenoid.

It is a further object of this invention to provide the maintenance of safety by effecting a fail-safe processing routine in the operational processor.

It is a still further object of this invention to easily trouble shoot it by providing a diagnostic function to the operational processor.

For a better understanding of this invention, a detailed description will be given below with reference to the accompanying drawings.

DETAILED DESCRIPTION OF THE INVENTION

Figure 1:
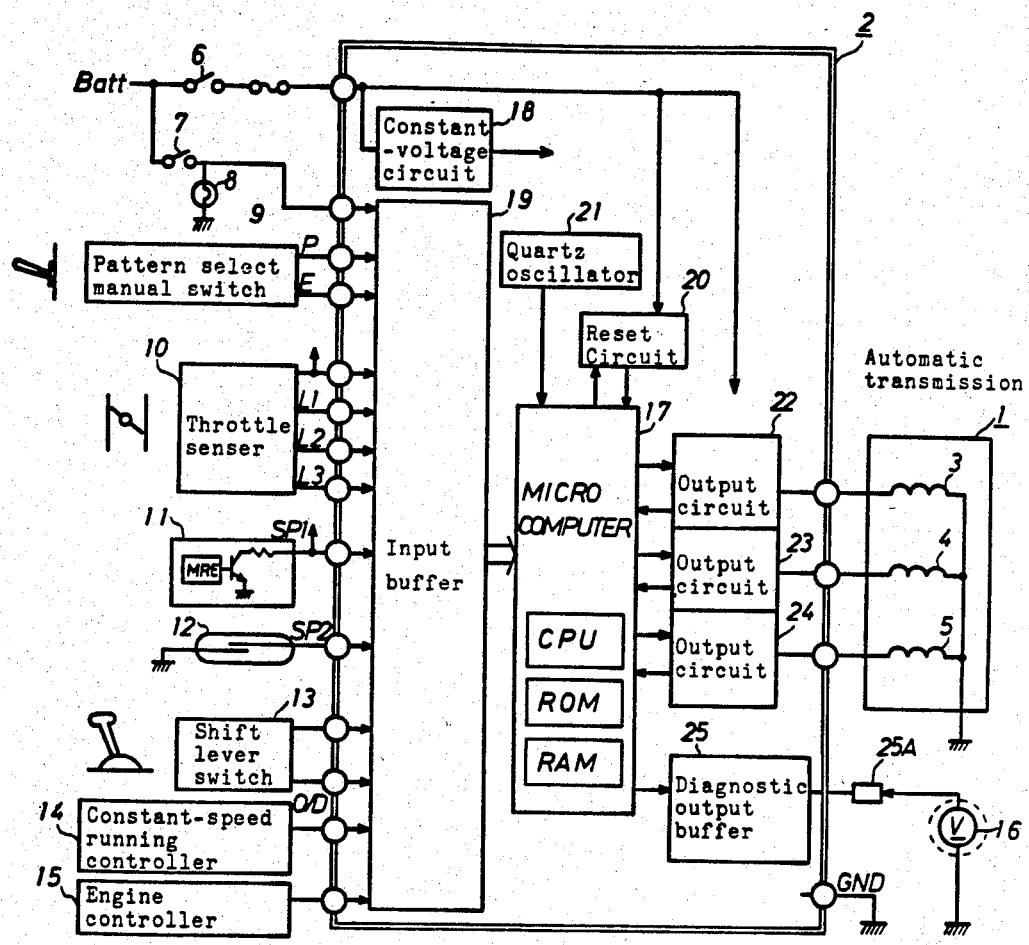
FIG. 1 is a block diagram showing an automatic transmission controller of this invention.

As shown in FIG. 1, the reference numeral (1) indicates an automatic transmission and (2) indicates an electronic controller for controllably driving a first shift solenoid (3), a second shift solenoid (4), and a lockup solenoid (5). The first shift solenoid (3) and second shift solenoid (4) are the selection means of 1st-speed, 2nd-speed, 3rd-speed or overdrive ranges (4th-speed). The lockup solenoid (5) controllably drives the lockup clutch (not shown) juxtaposed with a torque converter (not shown) and selects either the engine output transmitted via the torque converter to the drive shaft for driving the wheels or directly to the latter without passing there through. A key-switch (6), a vehicle foot brake switch (7), a vehicle brake lamp (8) and a pattern select manual switch (9) provide a means to select, manual operating such running modes as normal, power and economy. A throttle sensor (10), an example of an engine load sensor, has an idle contact for closing at an idle time at a time when a throttle valve is substantially closed and three contacts for closing at any other time mentioned above and for detecting a throttle opening degree corresponding to the combined pattern of the latter. A first vehicle speed sensor (11) generates a first speed signal $SP_1$ corresponding to a speedometer drive pulse. A second vehicle speed sensor (12) is located on the output shaft of the automatic transmission to generate pulse signals or a second speed signal $SP_2$, i.e., pulse signal having a frequency corresponding to the running speed. A shift lever switch (13) has reverse range (R-range) drive range (D-range), low range (L-range) and second range (S-range). A constant-speed running controller (14) develops an overdrive cut signal, i.e., O/D cut signal if vehicle speed is reduced, for example, by more than 10 km/h, in the overdrive running range. The constant-speed running controller (14) controls a vehicle speed to a setting speed of a driver, but detailed description is omitted because it is well know in the art.

An engine controller (15) is a means for generating a prohibition signal against locking-up for low engine temperatures and is used to control fuel injection and ignition timing of an engine, but detailed description is omitted because it is well known in the art. A tester (16) is connectable to a diagnosis terminal 25A of the controller so that the diagnostic function can be performed by an automobile mechanic. The electronic controller (2) comprises a microcomputer (17), a constant-voltage circuit (18), an input buffer (19), a reset circuit (20), a quartz oscillator (21), output circuits being designated at (22), (23) and (24), respectively, and a diagnostic output buffer (25). Each output circuit further has a function to detect wire breaking and short circuit.

With the key switch (6) switched on, the constant-voltage circuit (18) is actuated to effect the reset circuit

(20) to thereby reset the microcomputer (17) and output buffers (22), (23), and (24).

Figure 2A:
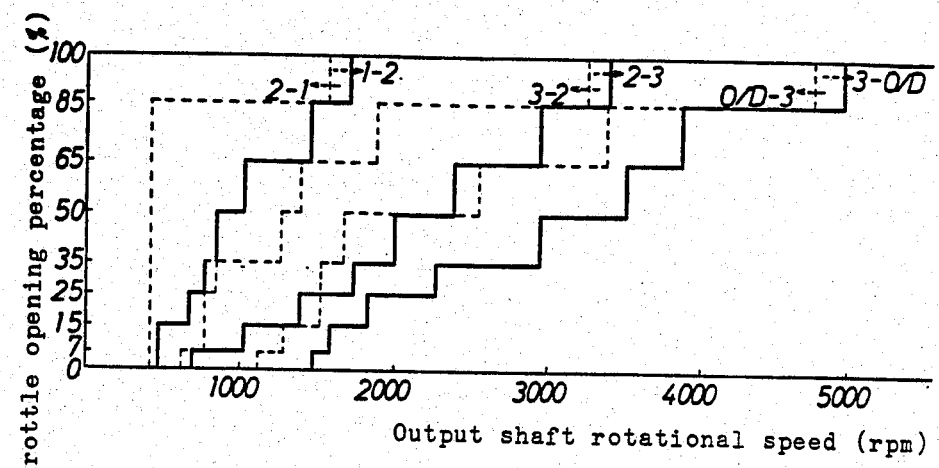
FIGS. 2A, 2B and 2C are diagrams of the shift pattern in the controller shown in FIG. 1.
Figure 2B:
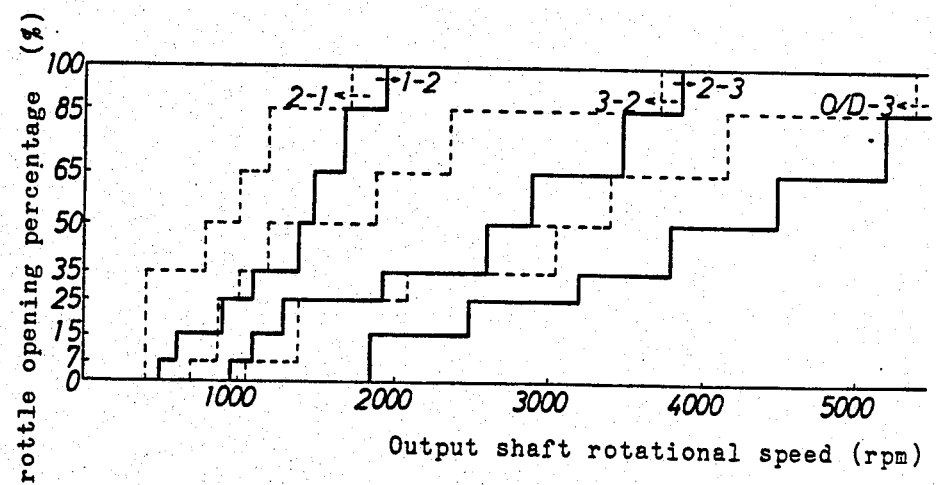
Figure 2C:
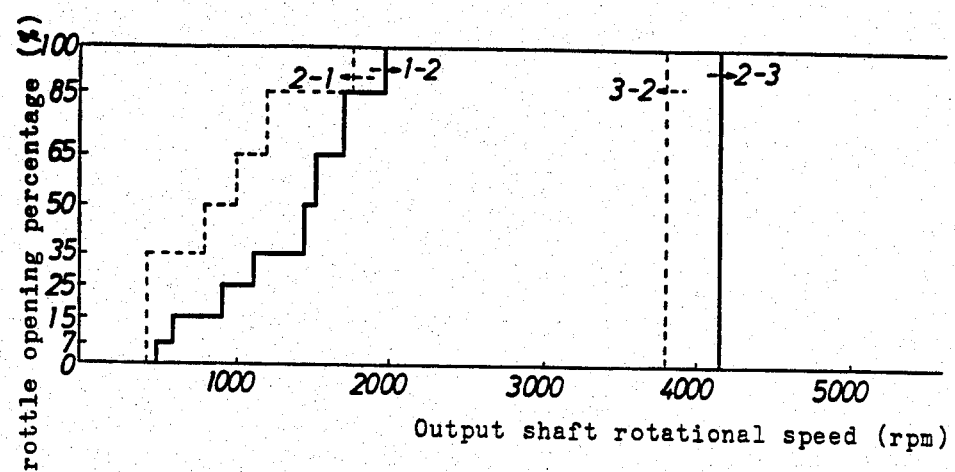
Figure 3A:
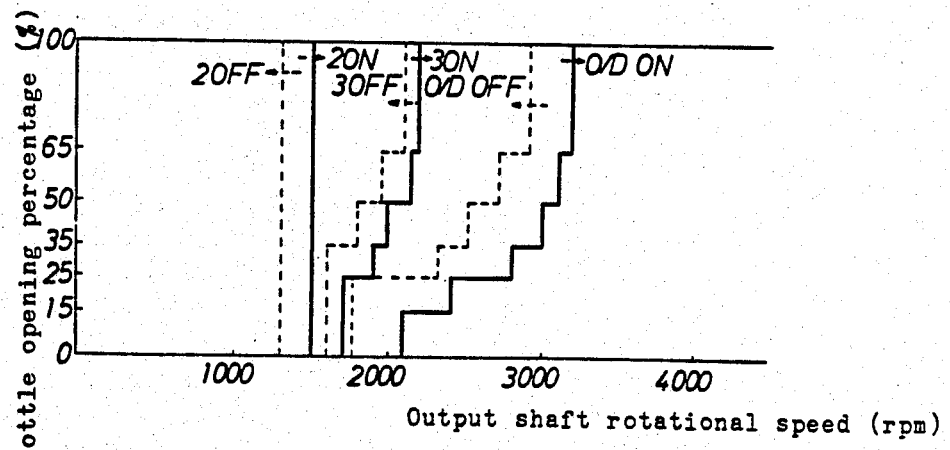
FIGS. 3A, 3B and 3C are diagrams of the lockup pattern in the controller shown in FIG. 1.
Figure 3B:
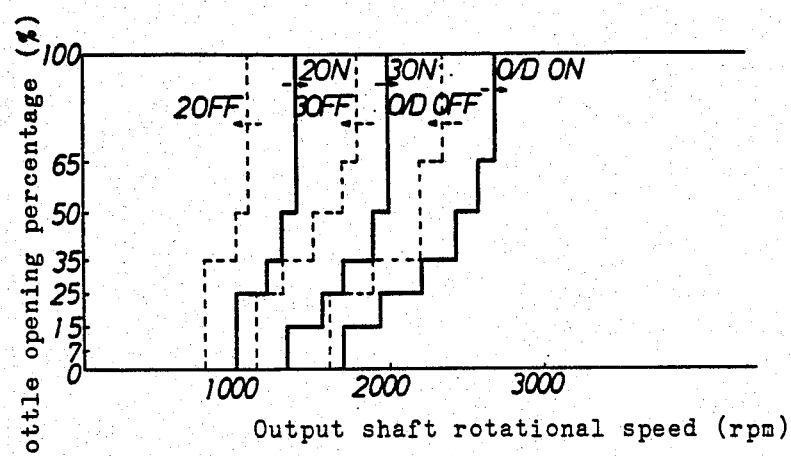
Figure 3C:
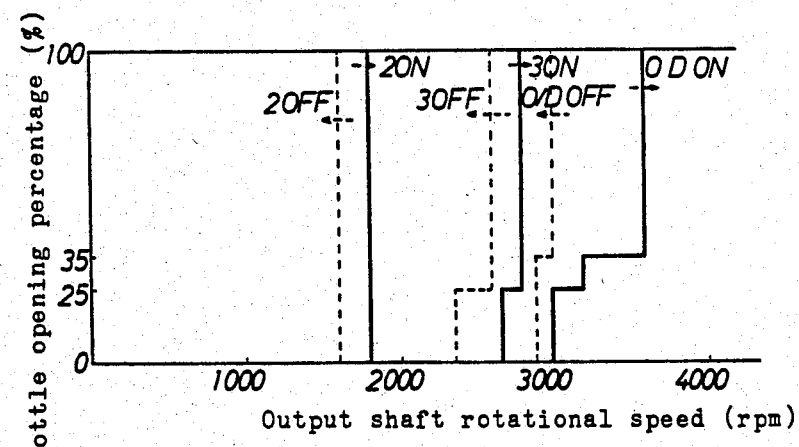

The microcomputer (17) has a CPU (central processor unit) and memory units RAM and ROM which store beforehand the shift pattern data corresponding to the shift patterns as shown in FIG. 2A to FIG. 2C and the lockup pattern data corresponding to the lockup patterns in FIG. 3A to FIG. 3C.

The shift patterns shown in FIG. 2A are selected in the normal or economy mode running to determine a shift position. The solid stepped line corresponding to sign 1-2 shows the up-shift positions at which a shift-up is determined from the 1st-speed range to the 2nd-speed range, similarly, the solid stepped lines corresponding to signs 2-3 and 3-O/D show up-shift positions from the 2nd-speed to the 3rd speed range and from the 3rd-speed to the overdrive range, respectively. The broken stepped line corresponding to signs 2-1, 3-2 and O/D-3 each shows the down-shift positions from the 2nd-speed range to the 1st-speed range, from the 3rd-speed range to the 2nd-speed range and from overdrive range to the 3rd-speed range. Furthermore, the shift patterns as shown in FIG. 2B are selected in the power mode running to determine the shift positions, while those as shown in FIG. 2C are selected in the power mode running in which the maximum speed stage is restricted to the 3rd-speed range due to the selection of the S-range by a shift lever switch (13).

The solid and broken stepped lines in FIG. 2B and FIG. 2C, and such signs as 1-2, 2-3, 3-O/D, O/D-3, 3-2 and 2-1 correspond to that in FIG. 2A mentioned above. As is obvious from FIG. 2B, the power mode shift patterns is decided in such a manner that the shift positions are wholly displaced right ward of the diagram compared with those in the normal or economy mode running to thereby be shifted at relatively higher speeds.

On the other hand, the lockup patterns as shown in FIG. 3A are selected in the normal mode running to determine the lockup positions. The solid line corresponding to sign 2ON in FIG. 3A shows the lockup-on positions at which the lockup solenoid (5) is operated when an automobile is running in the 2nd-speed range, similarly the solid lines corresponding to signs 3ON and O/DON showing the lockup-on positions to operate the lockup solenoid (5) in the 3rd-speed and overdrive ranges, respectively. Each broken line corresponding to signs 2OFF, 3OFF and O/DOFF shows the lockup-off positions at which the lockup solenoid (5) is released when running in the 2nd-speed, 3rd-speed and overdrive ranges. And the lockup patterns shown in FIG. 3B are selected in the economy mode running and those in FIG. 3C are selected in the power mode or in the normal mode running yet selecting the S-range by the shift lever switch (13) thereby determining the lockup positions. The solid and broken lines in FIGS. 3B and 3C and signs such as 2ON, 3ON, O/DON, 2OFF, 3OFF and O/DOFF correspond to those in FIG. 3A mentioned above, respectively.

The lockup patterns are of course established upon consideration of the relations between the shift operation according to the shift patterns, the magnitude of engine torque and the lockup operation. For example, with the automatic transmission selecting the 1st-speed range, each pattern is established so as not to be locked-up in any mode running, to avoid any engine stall or knocking, and the shift positions in the economy mode running are established at the low speed side over all speed ranges when compared with the lockup positions in the normal mode running and the power mode running. Thus in the economy mode running. The lockup-on and lockup-off are effected at relatively lower running speeds to, in practice, make an effective safety run.

Figure 4A:
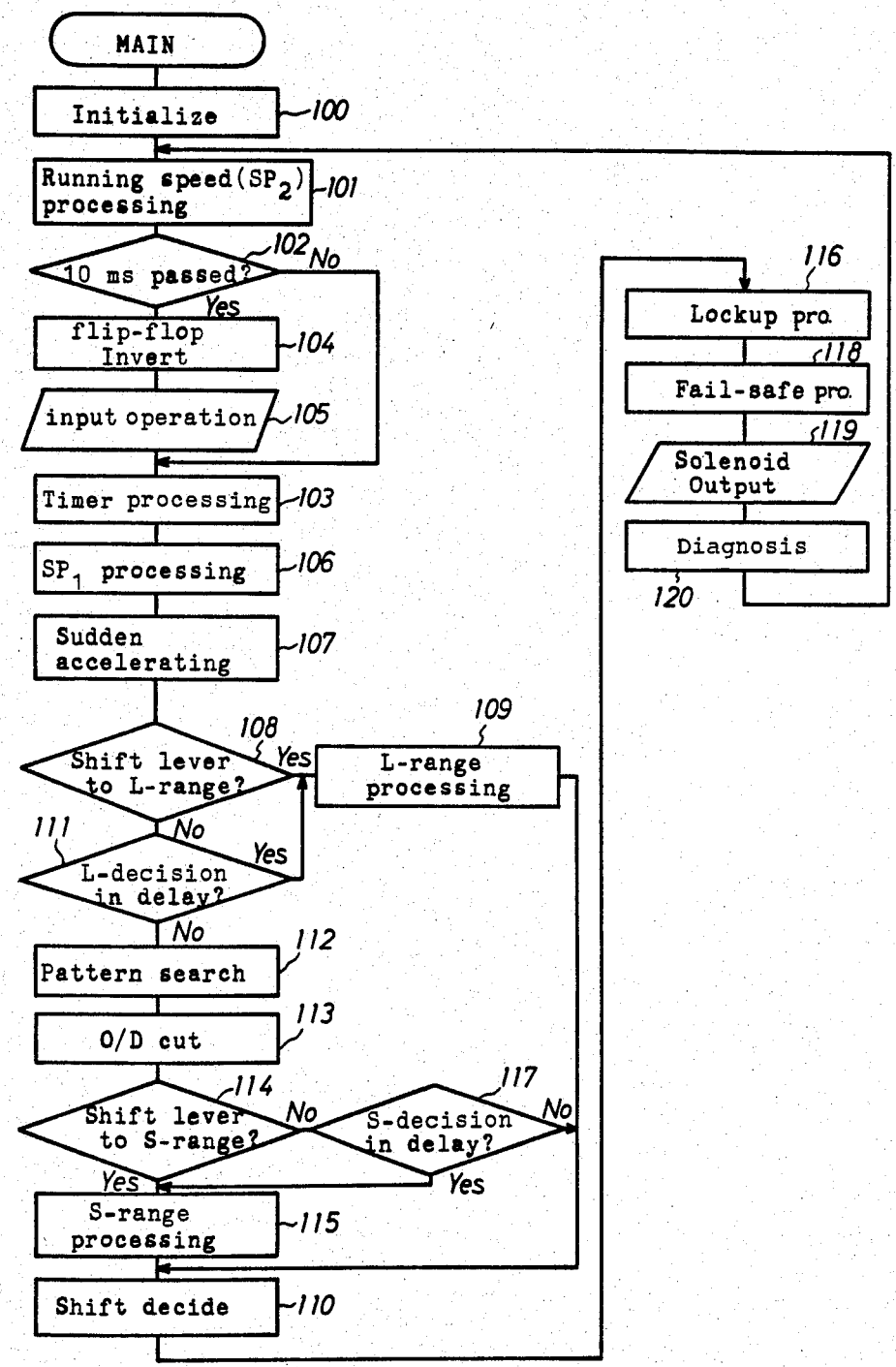
FIGS. 4A and 4B are flow charts illustrating the processings in this invention.

An example of the processing in the CPU of the microcomputer (17) will be described below referring to the flow chart shown in FIG. 4A.

Figure 4B:
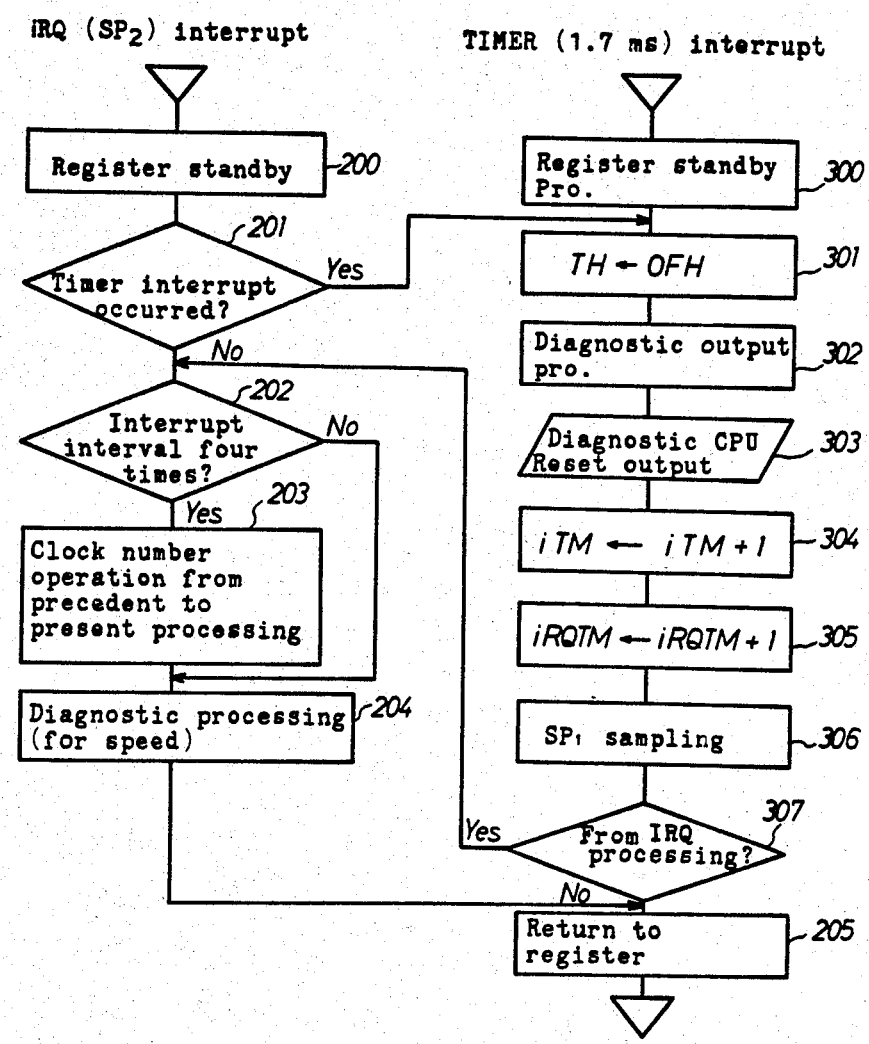

First, after the initialization has been made at step 100, the running speed ($SP_2$) processing for calculating the running speed according to the second running speed signal, $SP_2$, is carried out at step 101, which is done by using the clock number, obtained from an interrupt routine iRQ($SP_2$) as will be shown later in FIG. 4B, as a parameter.

Next, at step 102 is decided whether ten microseconds have passed or not. When decided that it has not, a timer processing is made at Step 103, when decided it has passed, at Step 104 a normal condition of the CPU is indicated by inverting a given flipflop in the input buffer 19. At the Step 105 each output signal from the pattern selector switch (9), the throttle sensor (10) the first speed sensor (11), the shift lever switch (13), the constant-speed controller (14) and the engine controller (15) is entered into the RAM via input buffer (19).

Then, the timing of various processings by the CPU is specified after the timer processing at Step 103. Next at step 106 the speed ($SP_1$) processing is subsequently carried out according to the first speed signal $SP_1$ detected by the first vehicle speed sensor for determining the vehicle speed. Sudden accelerating operation is carried out at Step 107 which turns the lockup-on to the lockup-off by a sudden release of the accelerator pedal and maintains said condition for a period of 0.1 seconds.

According to the output signal from the shift lever switch (13) entered as above-mentioned, the shift lever L-decision is made at Step 108. With the decision of having the shift lever set in the L-range, the L range-processing which reads previously stored transmission patterns (distinguished from the shift and lockup patterns above-mentioned) from the ROM at Step 109, is carried out followed by the shift decision processing Step 110.

On the other hand, with the decision not to have the shift lever set in the L-range, whether or not a period of 0.5 second has passed after the L-range was reset is decided by Step 111. During L-decision delay with the L-decision of a delay, the shift decision processing is performed at Step 110 via the above-mentioned L range-processing Step 109, while with the decision of the L-decision not being in delay, the pattern search processing is made at Step 112, which reads the shift pattern data corresponding to the shift pattern shown in FIGS. 2A to 2C and the lockup pattern data to the lockup patterns shown in FIGS. 3A to 3C from the memory. Then the O/D CUT processing is made at Step 113 which decides if a compulsory shift-down from the overdrive to any other range according to the O/D CUT signal from the constant-speed controller (14), thereafter, at Step 114 processing to the shift-lever S-decision is made.

Step 114 decides whether the shift lever is set in the S-range according to the output signal from the shift lever switch (13) and the decision in favor of the S-range set causes Step 115 to perform a processing such that data concerning O/D range is taken out of the shift and lockup pattern data read in Step 112, only data concerning the 2nd-speed range and 3rd-speed range are usable as the data at the shift deciding Step 110 and the lockup processing 116, which is described in the following page, thereafter the flow chart proceeds to the shift decision Step 110.

The contrary decision at Step 114 for the shift-lever leads to the S-decision delay deciding Step 117, whereat the shift decision processing is made at Step 110 with the decision of the S-decision in delay via the above-mentioned shift-lever S-processing Step 115 and the decision not in favor permits direct proceeding thereto.

The shift decision processing decides if shift-up operation shift-down operation or neither operation should be performed according to the above-mentioned shift pattern data gained from the pattern search Step 112, above-mentioned speed data from the speed ($SP_2$) processing Step 101, the throttle opening data corresponding to the throttle opening signal from the throttle sensor (10) and the running mode data corresponding to the running mode specifying signal from the pattern select switch (9) at Step 105. In this case, when the speed data obtained at Step 101 is determined as incorrect due to damage to the second speed sensor (12), etc., the above-mentioned speed data obtained from the $SP_1$ processing Step 106 is used instead. The lockup processing Step 116 decides whether lockup-on or lockup-off should or should not be performed according to the above-mentioned lockup pattern data read from the pattern search Step 112, the throttle opening data, the running mode data and the running speed data. In concrete terms, if the running mode is normal with the designation of ranges other than the S- and L-ranges, the lockup processing should be made according to the lock up pattern as shown in FIG. 3A. For example, if data becomes equal corresponding to the intersection of the drive shaft rotational speed and throttle opening in the 3rd-speed range which lies rightward of the solid line corresponding to sign 3ON, the lockup solenoid (5) is turned-on, and if said intersection is leftward of the broken line corresponding to sign 3OFF, the lockup solenoid (5) is turned off. While said intersection remains surrounded by the solid line corresponding to sign 3ON and the broken line corresponding to sign 3OFF, the lockup solenoid (5) is maintained as it is. The lockup processing is performed in the same manner as the above-mentioned lockup operation at 3rd-speed range, in other speed ranges such as the 2nd-speed and overdrive ranges. It is not desirable in the 1st-speed range to carry out the lockup processing from the viewpoint of power transmission and the same can be said for any other running mode. The lockup processing in the economy mode running is performed according to the lockup pattern shown in FIG. 3B and that in the power mode or the normal mode with the selection of the S-range according to FIG. 3C, each processing being performed in the same manner as that according to those shown in FIG. 3A.

Step 118 provides the fail-safe processing, which will be described hereinafter. The relation of the shift solenoids (3) and (4) and their shifts may be illustrated by Table 1, in which the solenoid $S_1$ designates a first shift solenoid (3) and the solenoid $S_2$ a second shift solenoid (4).

TABLE 1

| Range | Solenoid | 1st speed range | 2nd speed range | 3rd speed range | Overdrive range |
|---|---|---|---|---|---|
| D | $S_1$ | ON | ON | OFF | OFF |
|   | $S_2$ | OFF | ON | ON | OFF |
| S | $S_1$ | ON | ON | OFF |  |
|   | $S_2$ | OFF | ON | — |  |
| L | $S_1$ | — | — |  |  |
|   | $S_2$ | OFF | ON |  |  |

The driving state of the solenoids $S_1$ and $S_2$ is previously designed as shown in Table 1.

On the occurrence of troubles such as short circuits or disconnections in the solenoids $S_1$ and $S_2$, simultaneous shift-up and shift-down according to the patterns in Table 1. is required, but, for example, the shift-up from the 1st-range to overdrive range causes the output not to develop sufficient power for acceleration, and the shift-down from the 2nd- to 1st-range results in a sudden reduction of vehicle speed. Therefore, in order to minimize the operational troubles, the shift on the occurrence of a trouble is automatically produced to the control shift by masking it to the trouble shift, thereby avoiding the undesirable shifts above-mentioned, as illustrated in Table 2.

TABLE 2

| Range | Normal | Solenoid in trouble | Shift on trouble | Control shift |
|---|---|---|---|---|
| Drive | 1st-speed range | $S_1$ | Overdrive range | 3rd-speed range |
|  | 2nd-speed range | $S_2$ | 1st-speed range | Overdrive range |
| Second | 2nd-speed range | $S_2$ | 1st-speed range | 3rd-speed range (Mechanically) |

Figure 5:
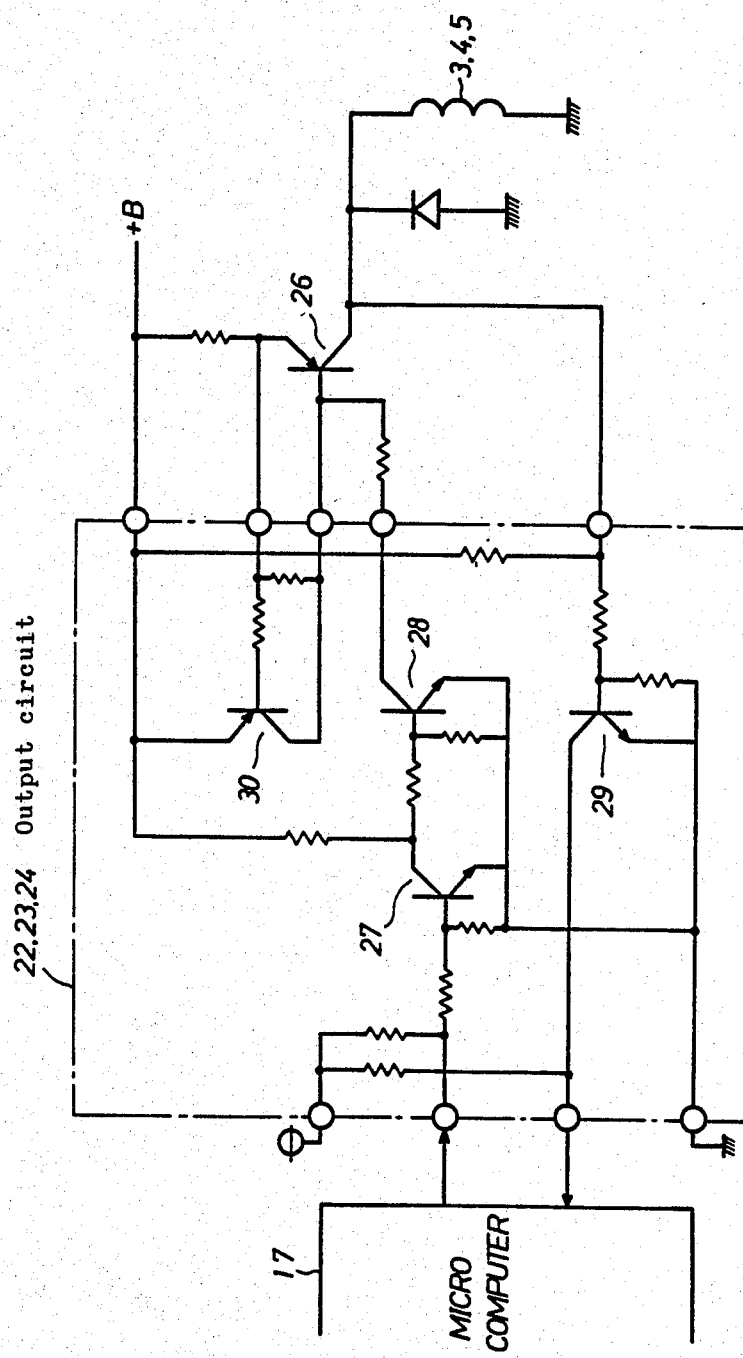
FIG. 5 is a schematic diagram of a circuit for trouble shooting.

Meanwhile, the detection circuit for damage to the solenoids, shown in FIG. 5, corresponds to signs (22), (23) and (24) in FIG. 1.

This detection circuit is not only used for trouble finding but also for the determination of solenoid drive patterns according to the input signals from the microcomputer (17), i.e., the solenoid control signals, which will be shown in detail as below.

In FIG. 5, signs (3), (4), (5), (17), (22), (23) and (24) are identical to those in FIG. 1 and a power transistor (26) supplies a driving current to the solenoid (3), (4), or (5), a control transistor (27) is switching-controlled by the input signal from the microcomputer (17), i.e., the solenoid control signal and also to switching-control the power transistor (26) via a transistor (28), a detecting transistor (29) detects the condition of the solenoid (3), (4) or (5) for normal, short-circuit or disconnection operations to put out solenoid state signals to the microcomputer (17), and, a bypass transistor is designated at (30) which protects the power transistor (26) from its transient puncture current on the occurrence of a short-circuit trouble of solenoid (3), (4) or (5).

In order to maintain the solenoids (3), (4) and (5) inoperative or cut-off, the microcomputer (17) develops a solenoid drive control signal of a high level value. Namely, the high level signal thus developed renders the control transistor (27) in continuity, the transistor (28) cut-off, the power transistor (26) cut-off and the solenoids (3), (4) cut-off. If the solenoids (3), (4) or (5) are normally cut-off condition, the detecting transistor

(29) continue to output to the microcomputer (17) high level solenoid state signals due to the detecting transistor being in the cut-off condition, while on the occurrence of a disconnection trouble, the detecting transistor (29) develops low level signals due to the turning-on of the detecting transistor (29). Therefore, the microcomputer (17) permits the determination of the occurrence of trouble from the inversion of the level of the solenoid state signal.

The occurrence of a short-circuit trouble is discovered as follows: If the microcomputer (17) decides that any of the solenoids (3), (4) and (5) being in the cutting-off condition are to be turned on, the solenoid drive control signals therefrom are of low level which turns off the control transistor (27) and turns on the transistor (28) and then the power transistor (26) is turned on which leads to turning the solenoid (3), (4) or (5) on. If the solenoid involved is normal, since the detecting transistor (29) is turned on due to an increase of the collector voltage accompanying the turn-on of the power transistor (26), the solenoid state signal may be inverted to a low level value. However, if any of the solenoids mentioned is in short-circuit, the transient current flows in the feed transistor (26) and the bypass transistor (30) turns on due to an increase of the forward bias between base-emitters thereof and the power transistor (26) turns off so that the feed to each solenoid comes to rest and the power transistor (26) are free from transient current.

The detecting transistor (29) remains in the cut-off condition because of insufficient increase of the collector voltage of the feed transistor (26) so that the solenoid state signal is maintained at a high level, thus microcomputer (17) determines the occurrence of short-circuit trouble and puts out a high level solenoid drive control signal. The microcomputer (17) puts out thereafter periodically a pulse signal with a pulse width of about one milli-second (ms) to the solenoids for inspecting the remedy of the short-circuit trouble. If the solenoids (3), (4) and (5) remain in the cut-off condition on receiving this input signal, the same circuit action as when the solenoid drive control signal was inverted to a low level takes place to render the detecting transistor (29) in the cut-off condition, thus maintaining the high level solenoid state signal. On the other hand, if they are returned to the normal condition at the full time, the power transistor (26) turns on to turn the solenoids on with the detecting transistor (29) being turned on. Therefore, the microcomputer (17) permits the determination of the remedy of the short-circuit trouble from the inversion of the solenoid state signal to the low level, and then puts out a low level signal to the solenoids remedied.

The fail-safe processing above-mentioned is in effect to determine the solenoid drive control signal to be developed when the present main routine is in practice wherein the solenoid state signals detected at the solenoid output step (119) in the preceding main routine may be used as the data for desicion and the output processing of the solenoid drive control signal is carried out at Step 119. At Step 119, the shift solenoid drive control signal is put out to the first shift solenoid (3) and the second shift solenoid (4) and the lockup solenoid drive control signal to the lockup solenoid (5) according to the solenoid drive patterns determined at the shift decision Step 110, the lockup processing Step 116 and the fail-safe Step 118.

The diagnostic processing is carried out at Step 120. This processing first decides a speed of either less than or equal to or greater than 9 km/h. If it is less than 9 km/h and the solenoids (3), (4) and (5) have failed, the diagnostic output buffer (25) keeps its output voltage, i.e., control output voltage of 8 V. If it is less than 9 km/h and solenoids (3), (4) and (5) are normal and further the speed sensors (11) and (12) have failed, the control voltage of 0 V is maintained. If it is less than 9 km/h and the solenoids (3), (4) and (5) and speed sensors (11) and (12) are normal, the control output voltage ranges from 0 to 8 V in proportion to the throttle opening, for example, zero volt when the throttle is fully closed and the idle contact is on; one volt when the throttle is completely closed and the idle contact is off; 8 V for full depression. On the other hand, when the running speed is equal to or greater than 9 km/h, the voltage to be developed should be in proportion to the shift in Table 3 in which L/U correspond to the lockup solenoid (5) in continuity and 1st-speed L/U to the false lockup in the first speed range due to the short-circuit in first shift solenoid (3) and lockup solenoid (5).

TABLE 3

| | |
|---|---|
| 1st-speed | 0V |
| 1st-speed L/U | 1V |
| 2nd-speed | 2V |
| 2nd-speed L/U | 3V |
| 3rd-speed | 4V |
| 3rd-speed L/U | 5V |
| Overdrive | 6V |
| Overdrive L/U | 7V |

And the results obtained are stored in the RAM to be used at the diagnostic output processing step as shown hereinafter. This diagnostic output processing Step 120 is considered to be a preprocessing or internal processing at the diagnostic output processing step in the timer interrupt routine. Various control output voltages above described are defined as an analog voltage obtained when a pulse voltage of about 30 Hz is changed by means of duty-ratio to an analog voltage level.

The main routine is performed by the repetition of such processing and operations as described above. The iRQ (SP$_2$) and timer interrupt routines are shown FIG. 4B, wherein the former starts routinely its operations with the rise or fall of the second speed signal SP$_2$ repeatedly entered from the second speed sensor (12) i.e., the occurrence of timer interrupt is decided at Step 201 after the processing of the register stand-by at Step 200 for the stand-by of the contents of data in a register to a given one and, if this occurs, the processing proceeds to the timer interrupt routine to perform successively the TH Processing and the following those in the flow chart of Timer (1.7 ms) interrupt in FIG. 4B, and proceeds to the interrupt interval frequency deciding Step 202, and, if it does not occur, the interrupt interval frequency deciding is performed at Step 202 to decice the interrupt interval of either four or less than four.

And, with four as the interrupt interval, the clock numbers from preceding to present processing are counted at the clock number operational processing Step 203, i.e., the time width between the input of the first pulse signal and that of the fifth one, which is used as a parameter for the calculation of speeds at the speed (SP$_2$) operational processing Step 101 in the main routine. After the performance of the clock number operational processing Step 203 or the decision of less than four of the interrupt interval at the interrupt interval frequency deciding Step 202, the diagnostic processing for the speed sensor (11) is performed at the diagnostic processing Step 204, and the data being held in a given register is provided to the former one.

In the iRQ interruption routine the parameter is formed for determining the speed ($SP_2$) according to the second speed signal $SP_2$ from the second speed sensor (12) as well as the diagnostic processing being made for the first speed sensor (11).

With the timer interrupt of such a given timing as 1.7 ms time interval, the timer interruption routine may individually be carried out for each timer interrupt. According to the data obtained from the performance of the following steps such as register standby processing Step 300, TH←OFH processing Step 301 for initializing the time value of the reference clock according to a data obtained at the diagnostic output processing Step 302 and the diagnostic processing at Steps 120 and 204, the control output voltage having a voltage level value corresponding thereto is output from the diagnostic output buffer (25).

And the following processing steps are performed in relation to developing the signal for indicating the normal diagnosis and the CPU, step of increasing value of iTM by one (iTM←iTM+1) Step 304 for memorizing the frequency of timer interruption for a cycle of the main routine, step of increasing value of iRQTM by one (iRQTM←iRQTM+1) Step 305 for adding speed operational timers, and the $SP_1$ sampling processing Step 306 for sampling the first speed signal $SP_1$ from the first speed sensor (11) for the data of $SP_1$ operation and for diagnosing in relation to the second speed sensor (12). At Step 307, whether the interruption is timer or iRQ is decided. If it is the timer, a course of processing is completed after the return of resistors being stood by, and if it is iRQ, the interruption interval deciding Step 202 and the following steps in the iRQ interrupt routine are performed in the same manner as described above.

The timer interrupt routine provides the data for the $SP_1$ operational Step 106 by sampling the speed signal $SP_1$ as well as the diagnosis for second speed signal $SP_2$ and further provides the information for the diagnostic processing to the diagnostic output buffer (25) to thereby develop the signal for indicating the normal operation of the CPU.

Furthermore, a vacuum sensor for the detection of the suction vacuum of a suction pipe may be used instead of the throttle sensor 10.

As shown above, in the electronic controller by driving the solenoids according to the speeds and engine loads thereof, a memory for storing beforehand the shift pattern data and the lockup pattern data in organic relationship therewith and the CPU for performing operational processing ccording to at least speed signals, engine load signals and shift and lockup pattern data read from said memory and for generating shift solenoid drive control signals and lockup solenoid drive control signals are provided, and the shift solenoid driving pattern and the lockup solenoid driving pattern are selectively combined to control the automatic transmission. And since the lockup processing may be performed according to the optimum lockup pattern in each running mode, the energy loss in the torque converter may be minimized and the whole energy efficiency may be increased thus allowing remarkable fuel savings.

The fail-safe processing makes it possible to prevent automobiles from abnormal running resulting from any trouble in solenoids and from the lockup in the 1st-speed running range, thus leading to the maintenance of a steady run.

The duplex system of speed sensors contributes to the maintenance of safety, because if one fails, then it is capable of being backed up by another.

Furthermore, the diagnostic processing may detect troubles in solenoids with ease by performing its diagnostic function properly.

What is claimed is:

1. An electronic automatic transmission control system for an automobile comprising:
    speed sensor means for producing a speed signal indicative of a running speed of the automobile;
    load sensor means for producing a load signal indicative of an engine load;
    manually operable mode selecting means for selecting any one of power, normal and economy modes;
    shift solenoid means for controlling shift of the automatic transmission;
    lock-up solenoid means for controlling lock-up of the automatic transmission;
    memory means for storing a plurality of shift patterns and lock-up patterns in relation to the running speed and the engine load; and
    processor means for selecting one of said shift patterns and one of said lock-up patterns in accordance with the mode selected by said mode selecting means, said processor producing a solenoid control signal for said shift solenoid means and said lock-up solenoid means based on the selected shift pattern and the selected lock-up pattern, respectively, in response to said speed signal and said load signal.

2. An electronic automatic transmission control system according to claim 1 further comprising:
    output circuit means connected to said shift solenoid means and said lock-up solenoid means for controlling activation and deactivation of said shift solenoid means and said lock-up solenoid means in response to said solenoid control signals from said processor means and producing solenoid state signals indicative of actual operating states of said shift solenoid means and said lock-up solenoid means;
    said processor means detecting solenoid failure of said shift solenoid means and said lock-up solenoid means in response to said solenoid control signals produced therefrom and said solenoid state signals produced from said output circuit means; and
    said processor means changing said solenoid control signals upon detection of the solenoid failure so that the shift and lock-up conditions of the automatic transmission caused by the solenoid failure are disabled and are changed to different shift and lock-up conditions.

3. An electronic automatic transmission control system according to claim 2, said output circuit means comprising:
    a detecting circuit for detecting said solenoid failure i.e. normal, short-circuit or disconnection condition of said shift solenoid means and lock-up solenoid means, and for outputting a signal indicative of said failure to said processor means; and
    a control circuit for controlling a feed circuit by said failure signal from said processor means, said feed circuit supplying voltage to said shift solenoid means and said lock-up solenoid means.

4. An electronic automatic transmission control system for an automobile comprising:

speed sensor means for producing a speed signal indicative of a running speed of the automobile;

load sensor means for producing a load signal indicative of an engine load;

solenoid means including a plurality of solenoids for controlling shifts and lock-up of said automatic transmission;

output circuit means connected to said solenoids for controlling the operation of said solenoids and producing solenoid state signals indicative of operating states of said solenoids; and programmed computer means connected to said speed sensor means, said load sensor means and said output circuit means and having a memory which stores a predetermined shift pattern and a lock-up pattern in relation to the running speed and the engine load, said computer means normally producing solenoid control signals applied to said output circuit means to control said solenoids in response to said speed signal and said load signal and based on said shift pattern and said lock-up pattern, said computer means detecting failure of said solenoids in response to said solenoid control signals produced therefrom and said solenoid state signals produced from said output circuit means and further changing said solenoid control signals upon detection of the solenoid failure so that the shift or lock-up condition of the automatic transmission caused by the solenoid failure is disabled and is changed to a different shift or lock-up condition.

5. An electronic automatic transmission control system according to claim 4, said output means comprising:

a detecting circuit for detecting said solenoid failure, i.e. normal, short circuit or disconnection condition of said solenoid means, and for outputting a signal indicative of said failure to said computer means; and a control transistor circuit for controlling a feed circuit by said failure signal from said processor means, said feed circuit supplying voltage to said solenoid means.

* * * * *